United States Patent [19]
Csoppenszky

[11] Patent Number: 5,802,568
[45] Date of Patent: Sep. 1, 1998

[54] SIMPLIFIED LEAST-RECENTLY-USED ENTRY REPLACEMENT IN ASSOCIATIVE CACHE MEMORIES AND TRANSLATION LOOKASIDE BUFFERS

[75] Inventor: Michael A. Csoppenszky, Los Gatos, Calif.

[73] Assignee: Sun Microsystems, Inc., Mountain View, Calif.

[21] Appl. No.: 660,090

[22] Filed: Jun. 6, 1996

[51] Int. Cl.$^6$ ..................................................... G06F 12/08
[52] U.S. Cl. .......................... 711/136; 711/144; 711/207; 711/108
[58] Field of Search ...................................... 395/463, 487, 395/471, 417, 435

[56] References Cited

U.S. PATENT DOCUMENTS 5,329,627  7/1994  Nanda et al. ............................ 711/207
5,353,425  10/1994  Malamy et al. ......................... 711/144

*Primary Examiner*—Eddie P. Chan
*Assistant Examiner*—Reginald G. Bragdon
*Attorney, Agent, or Firm*—Skjerven, Morrill, MacPherson, Franklin and Friel, LLP; David T. Millers

[57] ABSTRACT

A simplified or pseudo least-recently-used (LRU) process and circuit in a cache memory or translation lookaside table (TLB) maintains status bits to identify which entries are valid and which entries have been recently used. If none of the entries are invalid, only entries not indicated as recently used are replaced (or overwritten). When all entries are indicated as valid and recently used, status bits other than the status bits for the entry last accessed are changed to indicate that the corresponding entries have not been recently used. Accordingly, those entries can be replaced, but the most recently used entry still cannot be replaced. This makes the pseudo LRU process closer to a full LRU process when compared to pseudo LRU processes which clear all status bits simultaneously. Complexity for the LRU process is not greatly increased because the address generated for the most recent access of an entry can be used to identify the bit which is not changed.

14 Claims, 5 Drawing Sheets

SIMPLIFIED LEAST-RECENTLY-USED ENTRY REPLACEMENT IN ASSOCIATIVE CACHE MEMORIES AND TRANSLATION LOOKASIDE BUFFERS

BACKGROUND OF THE INVENTION

1. Field of the Invention

This invention relates to systems using associative cache memories or associative translation lookaside buffers (TLBs) and to circuits and processes for selecting an entry of a cache memory or TLB for replacement.

2. Description of Related Art

Many computer systems have associative cache memories which provide rapid access to a limited amount of frequently used information stored in a limited number of entries. Each entry in an associative cache memory typically includes stored information, a tag indicating an address associated with the stored information, and a validity bit indicating whether the entry is valid. When a central processing unit (CPU) accesses information from a cache memory, tags and validity bits are checked to determine whether the cache memory contains the desired information. For example, a CPU accesses data or instructions by sending an address to the data or instruction cache. If the cache contains a valid entry for the address, there is a cache hit; and the cache returns the desired data or instruction. Otherwise, there is a cache miss, and access to main memory is required.

A translation look-aside buffer (TLB) is a type of cache memory used to convert one type of address (e.g. a virtual or physical address) to a second type of address (e.g. a physical or virtual address). When a CPU requires a physical address corresponding to a virtual address, the CPU sends the virtual address to the TLB; and if the TLB contains a valid entry associated for the virtual address, the TLB returns a physical address. Otherwise, calculation of the physical address, which is slower than a TLB access, is required.

A problem for associative cache memory is limited storage or entries. Typically, for each cache miss, the cache memory stores new information so that the cache memory has the just requested information for faster, future accesses. If the cache memory is full, one of the older entries is overwritten. For efficient operation, the entry overwritten should be an invalid entry or the entry least likely to be accessed by the CPU. A least-recently-used (LRU) replacement process overwrites the entry that was least recently accessed because statistically that entry is the least likely to be accessed in the near future.

A fully accurate LRU process is relatively complex which can make an LRU circuit slower, larger, and more expensive than desired. Accordingly, simplified LRU processes have been developed. U.S. Pat. No. 5,329,627, which is incorporated by reference herein in its entirety, describes a simplified LRU process and associated circuits. In the simplified LRU process, each entry includes a validity bit and a "used" bit. The used bit for an entry are set when the entry is accessed. Whenever a new entry is written to a cache or TLB using this simplified LRU process, any invalid entries are overwritten first. If all entries are valid, one of the entries which does not have a used bit set is overwritten. Whenever all entries have validity and used bits set, the used bits are cleared to allow for writing of new entries. Typically, the frequently used entries have their used bit set again before being overwritten so that most often used entries are preserved. However, occasionally the most often used entries are over written immediately or soon after the used bits are cleared. This makes the cache memory less efficient because slower processes must obtain the information no longer in the cache memory. Such inefficiencies would be reduced if the simplified LRU process more closely matched a full LRU process. Accordingly, simplified LRU processes are sought which more closely match the behavior of a full LRU process but are not complex.

SUMMARY OF THE INVENTION

In accordance with the invention, a pseudo or simplified least-recently-used (LRU) process and circuit maintains a status bit per entry to identify entries in an associative cache memory which have been recently used and when all entries are valid, only replaces (or overwrites) entries not indicated as recently used. In one embodiment, each entry in an associative cache memory has two corresponding status bits, a "validity" bit and a "used" bit which are set to indicate respectively whether the entry is valid and whether the entry is recently used. When all entries are indicated as recently used and valid, status bits other than the used bit for the last accessed entry are changed so that those entries can be replaced. The status flag for the most recently accessed entry is unchanged so that the most recently used entry still cannot be replaced. This makes the simplified LRU process closer to a full LRU process when compared to LRU processes which clear all flag bits simultaneously. Process complexity increase is minimal because the address signal most recently generated when accessing an entry is available to identify the status flag which is not changed.

One embodiment of the LRU replacement process for a cache memory or TLB maintains used bits that indicate which entries have been recently accessed and therefore are not available for replacement or overwriting. The used bit corresponding to the last changed entry is maintained when other used bits are changed to make some entries available for replacement.

An entry replacement circuit implementing the LRU replacement process includes: a first register capable of storing the used bits; a selection circuit which selects an entry that corresponds to a used bit that is in a first state if all of the entries contain valid information; and a reset control circuit which in response to all of the entries being valid and all of the used bits being in a second state, changes a set of used bits from the second state to the first state but leaves the used bit corresponding to the most recently accessed entry in the second state. The most recently accessed entry or entries can be identified from previous address signal values used to access entries in a cache memory. One or more of these previous address signal values can be stored in registers to identify which used bits are not changed. The reset control circuit can change every used bit except one or some smaller subset of used bits.

Embodiments and aspects of the invention will be more fully understood in view of the figures and the following detailed description of the invention.

BRIEF DESCRIPTION OF THE DRAWINGS

Use of the same reference symbols in different figures indicates similar or identical items.

DETAILED DESCRIPTION OF THE PREFERRED EMBODIMENTS

In accordance with an aspect of the invention, a simplified least-recently-used (LRU) entry replacement unit for an associative translation lookaside table (TLB) or other associative cache memory includes a register containing "used" bits for entries stored in the TLB or cache memory. Setting the used bit of an entry indicates that the entry has been recently accessed and prevents the entry from being overwritten. When all entries have used bits set, the replacement unit resets used bits not including the used bit of an entry corresponding to the last entry accessed. An address signal used during the access which sets the last used bit identifies the used bit to be maintained rather than cleared, and minimal additional circuitry and minimal increase in complexity is required to maintain a used bit identified by the address signal. Not clearing the used bit of the last accessed entry makes the simplified LRU process more closely resemble a full LRU process and thereby improves efficiency of the associative cache memory or TLB.

Figure 1:
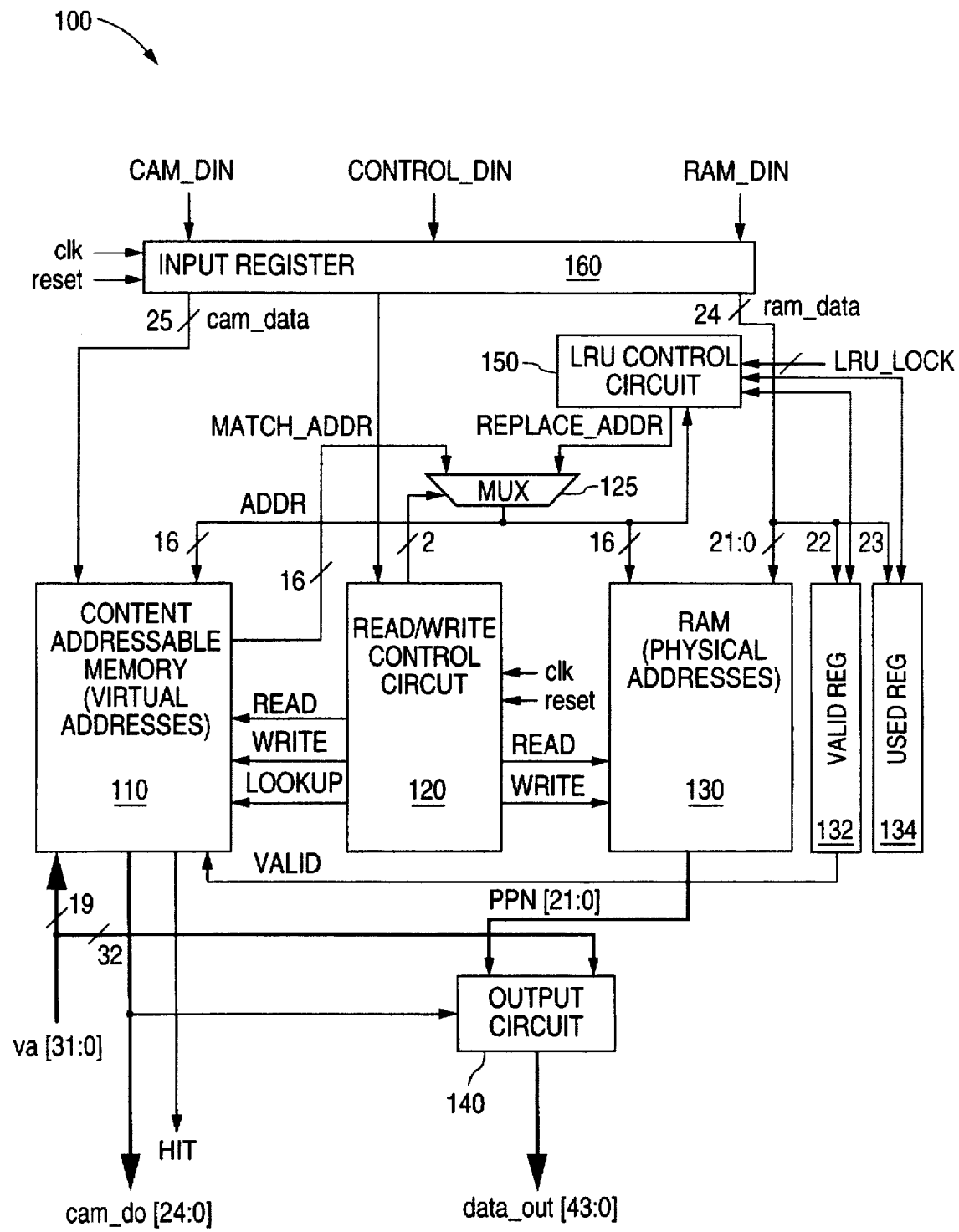
FIG. 1 shows a block diagram of a translation lookaside buffer in accordance with an embodiment of the invention.

FIG. 1 shows a TLB 100 in accordance with an embodiment of the invention. TLB 100 may be incorporated in a microprocessor to map one type of address (e.g. a physical or virtual address) to another type of address (e.g. a virtual or physical address). As an exemplary embodiment, mapping of virtual addresses for external devices to physical addresses used by a processing core is described in regard to FIG. 1. Many other applications are possible. The example TLB 100 contains sixteen entries which are spread over portions of a content addressable memory (CAM) 110, a random-access memory (RAM) 130, a register 132, and a register 134. CAM 110 stores virtual addresses (tags) for the entries. RAM 130 stores the physical addresses corresponding to the virtual addresses; and register 132 and register 134 store status bits referred to validity and used bits, respectively.

In operation, an input signal VA to TLB 100 represents a virtual address. The most significant bits of the virtual address are asserted to CAM 110 which contains a comparison circuit which checks for a matching tag. A signal MATCH_ADDR from CAM 110 has at most one bit asserted to identify which, if any, of the entries matches signal VA. One bit of signal MATCH_ADDR is asserted if signal VA matches a tag for an entry in CAM 110. Otherwise, none of the bits of signal MATCH_ADDR are asserted.

If a matching tag is found, a control circuit 120 and multiplexer 125 provide signal MATCH_ADDR as an address signal ADDR for RAM 130, register 132, and register 134. Control circuit 120 reads RAM 130 to generate a signal PPN representing a physical page number. Circuitry associated with CAM 110 also checks the validity bit corresponding to the matching tag (if any) and asserts a signal HIT if a matching entry is found and the validity bit for the matching entry is set. An output unit 140 concatenates the physical page number from signal PPN with least significant bits from signal VA to generate a physical address represented in a signal DATA_OUT. The least significant bits of signal VA are an offset which is added to a physical page number found in RAM 130. Additional status bits such as byte enables can also be incorporated in signal DATA_OUT.

If CAM 110 does not find a match or if the matching entry is invalid, there is a TLB miss, and signal HIT is deasserted to initiate another translation process that generates the desired physical address. A new entry including the generated physical address and associated tag are then written into TLB 100. An LRU control circuit 150 generates a signal REPLACE_ADDR which identifies which entry (portions of CAM 110 and RAM 130) stores the tag and newly generated physical address. An input signal CAM_DIN indicating the tag to be written to CAM 110 and an input signal RAM_DIN indicating a physical page number, a validity bit, and a used bit to be written respectively to RAM 130, register 132, and register 134 are stored in an input register 160 of TLB 100. Read/write control circuit 120 and multiplexer 125 select signal REPLACE_ADDR as address signal ADDR for writing the new entry to CAM 110, RAM 130, register 132, and register 134.

Figure 2:
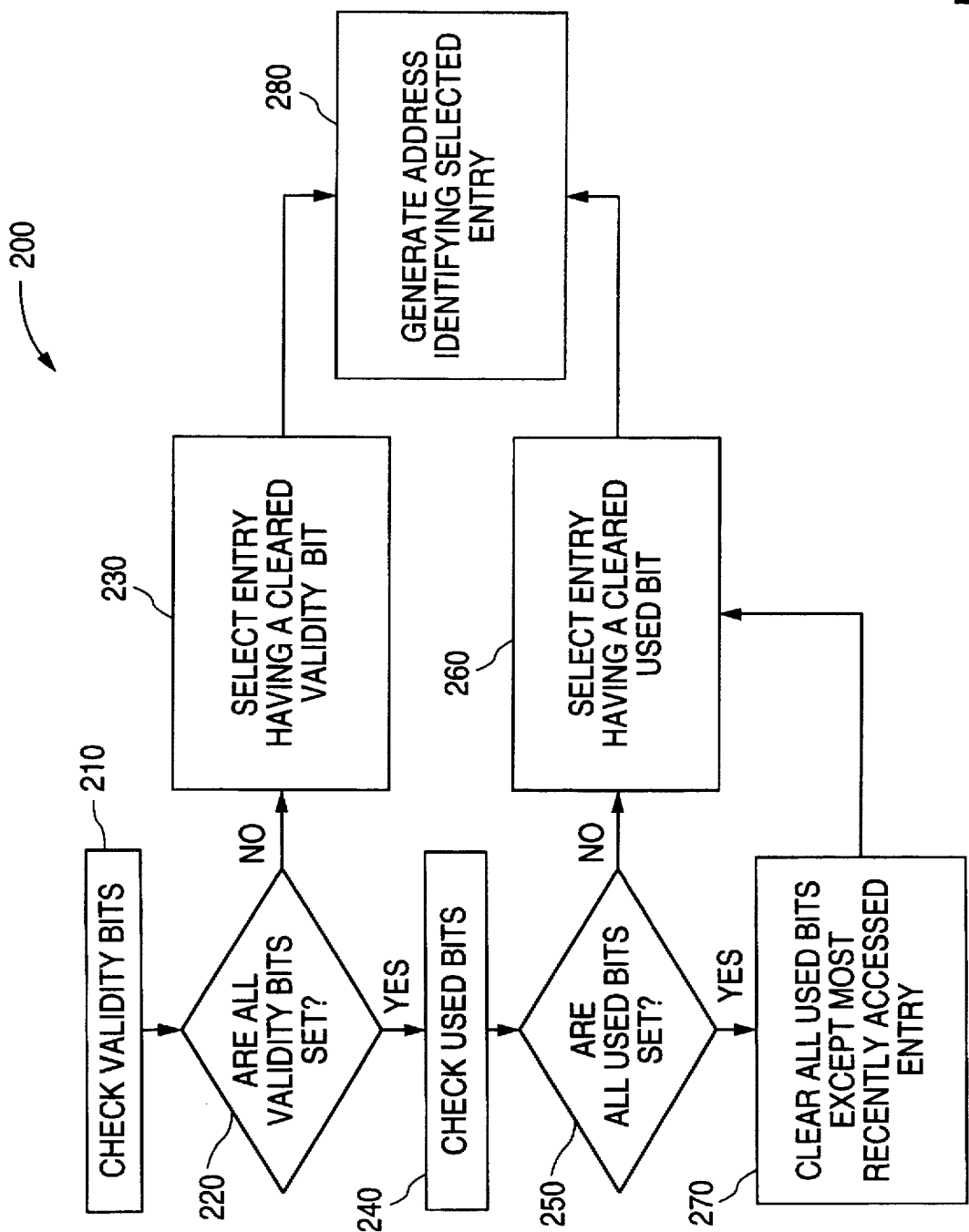
FIG. 2 shows a flow diagram for a simplified or pseudo least-recently-used replacement process in accordance with an embodiment of the invention.

FIG. 2 shows a flow diagram of a simplified LRU process 200 implemented by LRU control circuit 150 when generating signal REPLACE_ADDR. In an initial step 210, LRU control circuit 150 searches the validity bits in register 132 to determine whether any the entries in TLB 100 contain invalid information. The search may be performed in a priority order from the first to the last entry in TLB 100. If any validity bit indicates an invalid entry, LRU control circuit 150 in step 230 selects an invalid entry (preferably the first invalid entry found in the priority ordered search) and in step 280 generates address signal REPLACE_ADDR to identify the selected invalid entry.

If all of the entries are valid, LRU control circuit 150 in step 240 searches the used bits for an entry which was not recently used. If the used bits indicate that one or more of the entries can be replaced, step 260 selects one of those entries. The search for an entry not recently used may be performed in strict priority order from the first entry to the last entry in the same manner as the search for an invalid entry. For the process of FIG. 2, a used bit in an entry is set when the entry is accessed. Accordingly, if only one of the entries has its used bit cleared, that entry is the least recently accessed entry, and LRU circuit 150 selects the same entry for replacement as would a full LRU process. More typically, LRU circuit 150 in step 260 selects a highest priority entry or a random entry from the set of entries having cleared used bits, and the selected entry is not always the least recently used but is one of the less recently used entries.

If all of the validity bits and used bits are set, TLB 100 is full of valid entries all of which have been recently used. The used and validity bits do not indicate the order in which the entries where used or which entry was least recently used or most recently used. However, the last value of signal ADDR from multiplexer 125 indicates the most recently used entry. LRU circuit 150 in step 270 clears all bits in used register 134 except the bit indicated by signal ADDR and then in step 260 selects one of the entries having a cleared used bit. Accordingly, the most recently used entry is not immediately replaced.

Figure 3:
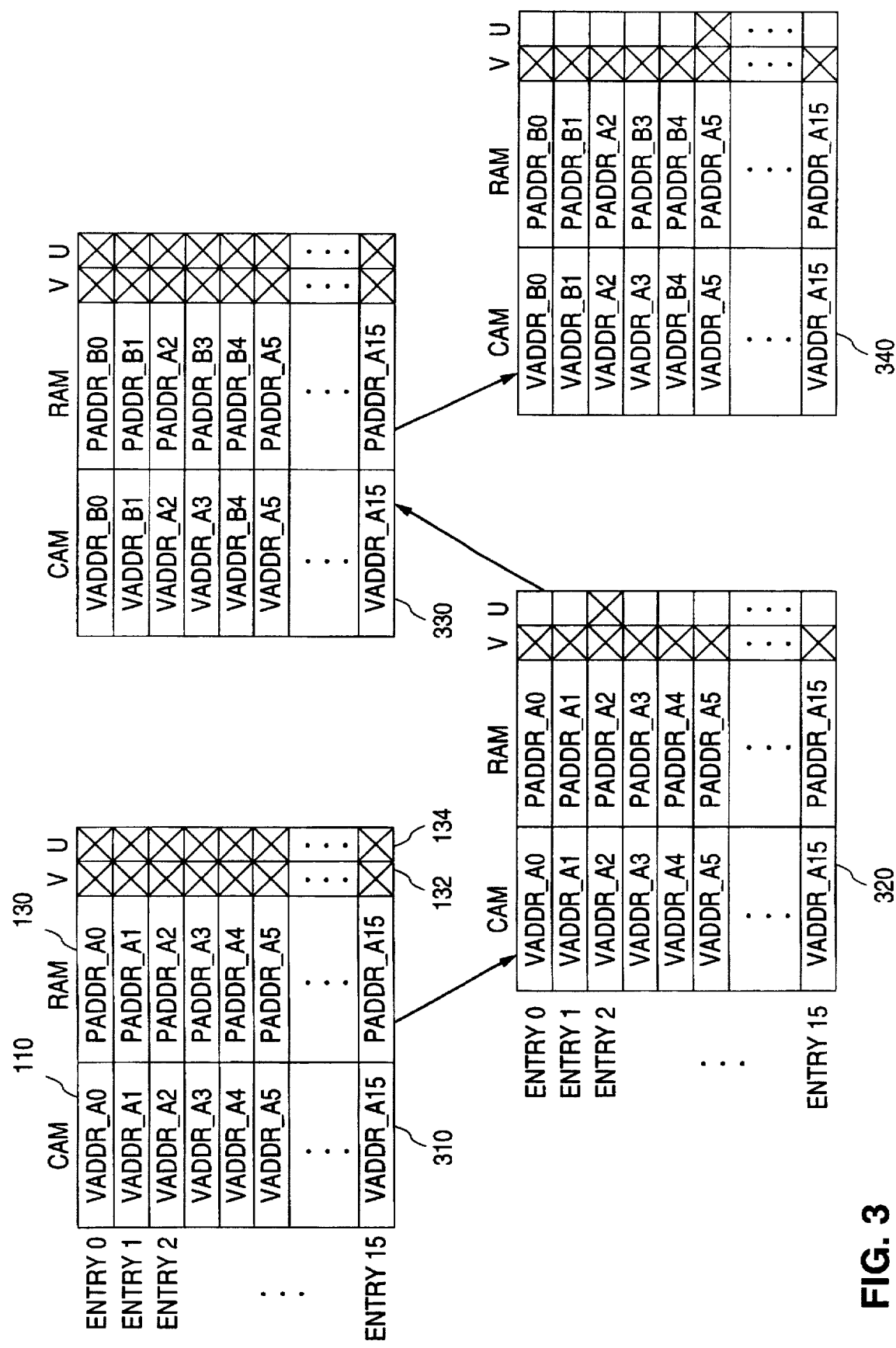
FIG. 3 shows the content of a translation lookaside buffer at four different times using a simplified least-recently-used replacement process.

FIG. 3 illustrates an example of the information contained in TLB 100 at four times 310, 320, 330, and 340. Time 310 is immediately after new information is written to an entry 2. TLB 100 then contains tags VADDR_A0 to VADDR_A15 and physical addresses PADDR_A0 to PADDR_A15 and all of the validity and used bits are set to indicate all entries are valid and recently used (i.e. unavailable for replacement). At time 320 which was just after entry 2 is accessed and before the next access of TLB 100, LRU control circuit 150 clears all used bits except for the used bit of entry 2 (the last accessed entry). This permits overwriting of old information in any of the entries except entry 2. Subsequent accesses of TLB 100 are likely to hit in TLB 100 and set used bits before all of the information is overwritten. However, TLB misses before a particular entry is accessed or the processor core clearing validity bits in response to changes in the mapping between virtual and physical addresses causes overwriting of some of the information.

Time 330 is an example where accessing entry 5 sets the last used bit in register 134. In the example, before accessing entry 5, entry 15 was accessed at least once setting its used bit before entry 15 was overwritten. Entries 0, 1, and 4 were overwritten with new information (VADDR_B0, PADDR_B0, VADDR_B1, PADDR_B1, VADDR_B4, and PADDR_B4), and entry 3 was invalidated and then accessed to overwrite the physical address page number in RAM 130. Unless invalidated by the processor core, virtual address VADDR_A2 and physical address PADDR_A2 could not have been overwritten between times 320 and 330 because the used bit corresponding entry 2 remained set from time 310 until time 340. Efficiency of TLB 100 is improved over simplified LRU processes which erase all used bits because TLB 100 always retains the most recently accessed information (VADDR_A2 and PADDR_A2) which is most likely to be accessed soon. At time 340, LRU control circuit 150 clears all the used bits except the used bit for entry 5, the most recently accessed entry, so that the most likely to be accessed information is more likely to be retained after resetting the used bits.

Figure 4:
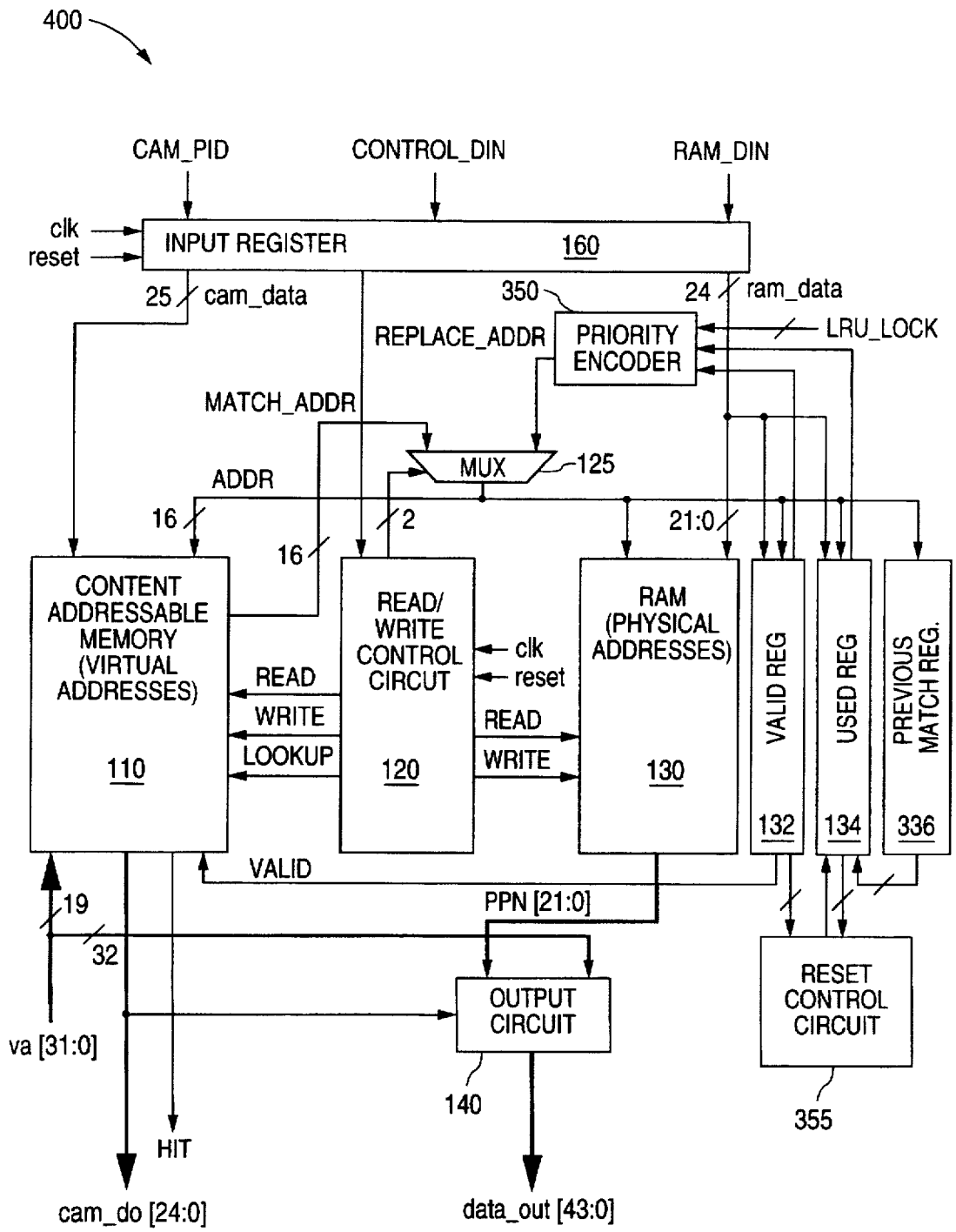
FIG. 4 shows a block diagram of a translation lookaside buffer in accordance with an embodiment of the invention.

LRU control circuit 150 determines the most recently accessed entry from signal ADDR and when used bits in register 134 are cleared to allow for writing new entries, inhibits clearing of the used bit for the most recently accessed entry. FIG. 4 shows a block diagram of a TLB 400 in accordance with another embodiment of the invention. TLB 400 includes a register 336 which stores the previous value of signal ADDR to identify the just accessed entry. In TLB 400, a priority encoder 350, register 336, and a reset control circuit 355 implement the simplified LRU replacement process described above in regard to FIGS. 2 and 3 and LRU control circuit 150. Otherwise, TLB 400 contains similar circuit elements to those described above in regard to TLB 100 of FIG. 1, and the above description applies to FIG. 4.

As described above in regard to FIG. 1, when an entry is accessed to retrieve or write a physical address in RAM 130, signal ADDR from multiplexer 125 has a single bit set that identifies the entry being accessed. Register 336 latches the value of signal ADDR each time RAM 130 is accessed and holds the value until the next access. A change in the used and/or validity bits during the access may cause priority encoder 350 to change signal REPLACE ADDR in preparation for the next time read/write control circuit 120 writes an entry in TLB 400. To generate signal REPLACE_ADDR, priority encoder 350, in effect, scans the validity bits in register 132 and the used bits in register 134. If any of the validity bits are cleared to indicate that an entry is invalid, priority encoder 350 selects the first encountered entry which has a cleared validity bit. If all of the validity bits are set, priority encoder 350 selects the first encountered entry which has a cleared used bit. The actual selection need not follow the just described chronological order of scans. Priority encoder 350 can scan registers 132 and 134 in parallel using look-ahead techniques to rapidly identify the selected entry and generate signal REPLACE_ADDR.

Signal REPLACE_ADDR is not immediately changed when all validity and used bits in registers 132 and 134 are set. Instead, priority encoder 350 selects an entry for replacement and changes signal REPLACE_ADDR after reset control circuit 335 clears used bits in register 134 in response to all of the validity and used bits being set. In an exemplary embodiment of the invention, reset control circuit 335 clears all of the used bits in register 132 except for the used bit of an entry identified by the value stored in register 336.

Figure 5:
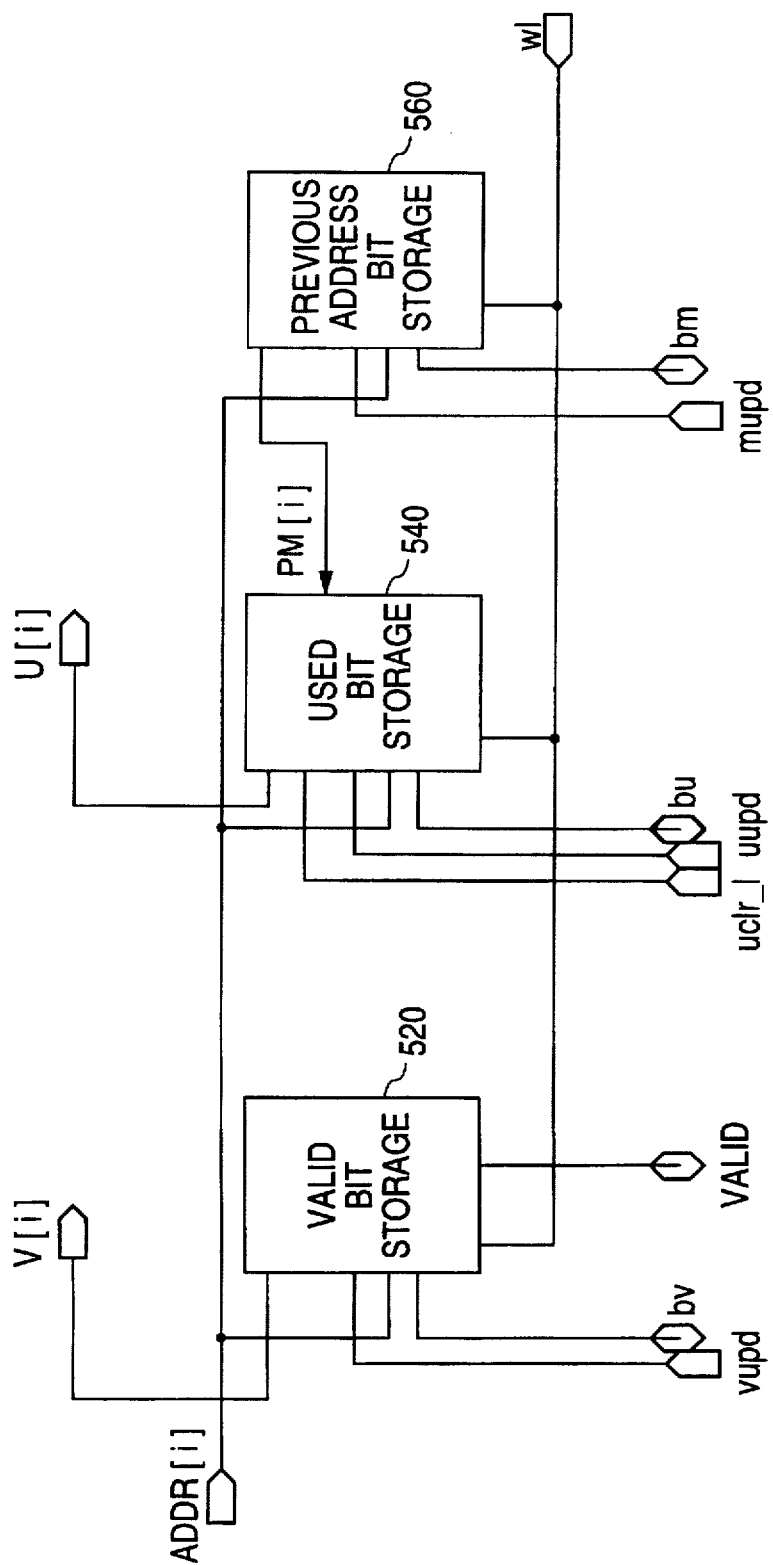
FIG. 5 illustrates storage elements for validity, used, and previous match bits of an entry in the translation lookaside buffer of FIG. 4.

FIG. 5 shows storage elements 520, 540, and 560 which are elements in registers 132, 134, and 336 respectively. Each storage element 520, 540, and 560 can be a latch, a SRAM cell, or other type of memory cell having write circuits, set and reset circuits, enable circuits, and output drivers as required for the functions described below. Storage elements 520 and 540 respectively store validity and used bits for an entry i, and storage element 560 stores a corresponding bit i from a previous value of signal ADDR. Output signals V[i], U[i], and PM[i] indicate bits stored in respective storage elements 520, 540, and 560.

A bit ADDR[i] of signal ADDR is a data input signal to storage elements 520, 540, and 560. When an entry is accessed, read/write control circuit 120 asserts signals VUPD, UUPD, and MUPD to storage elements 520, 540, and 560. Signals VUPD and UUPD set the bits in storage elements 520 and 540 if signal ADDR[i] is high. Otherwise, the bits in storage elements 520 and 540 are unchanged. Signal MUPD causes storage element 560 to store the value of ADDR[i] whether ADDR[i] is high or low. Storage elements 520, 540, and 560 can also be written by asserting then deasserting a signal WL which causes storage elements 520, 540, and 560 to latch values represented by respective input signals BV, BU, and BM.

Reset control circuit 355 generates a signal UCLR_I to clear register 134 when all validity and used bits in registers 132 and 134 are set. An output signal PM from register 336 disables clearing of the used bit for the entry corresponding to the previously accessed entry. In particular, output signal PM[i] from storage element 560 being high disables clearing of storage element 540. Since only one bit stored in register 336 is set, signal UCLR_I clears all of the used bits except one.

An alternative embodiment of the invention clears a subset of the bits in register 134 and leaves multiple bits in register 134 set. In one embodiment of the invention, multiple registers which retain the most recent values of signal ADDR select which used bits remain set when the other used bits are cleared. In a particular embodiment, register 336 can be replaced by a shift register; and during each access of TLB 100, a newest value for signal ADDR is stored into the shift register and an oldest value for signal ADDR in the shift register is discarded. When an access of TLB sets the last of the used bits, register 134 is cleared except for the entries corresponding to the one or more values in the shift register.

Although the present invention has been described with reference to particular embodiments, the description is only an example of the invention's application and should not be taken as a limitation. Various adaptations and combinations of features of the embodiments disclosed are within the scope of the invention as defined by the following claims.

I claim:

1. An entry replacement circuit comprising:

a first register capable of storing a plurality of bits which corresponds to a plurality of entries, a first of the bits corresponding to a most recently accessed one of the entries;

a selection circuit which is coupled to the first register and generates a signal identifying one of the entries for replacement, wherein if all of the entries contain valid information, the signal identifies an entry that corresponds to a bit which is in a first state;

a reset control circuit coupled to the first register, wherein in response to all of the bits in the first register being in a second state which differs from the first state, the reset control circuit changes a set of bits in the first register from the second state to the first state and leaves the first bit in the second state; and a second register which stores a first value identifying the first bit.

2. The entry replacement circuit of claim 1, wherein the set of bits changed from the second state to the first state includes every bit in the register except the selected bit.

3. The entry replacement circuit of claim 1, wherein the second register is coupled to prevent the reset control circuit from changing the first bit.

4. The entry replacement circuit of claim 1, wherein the second register further stores a second value that identifies a second of the bits, the second bit corresponding to an entry accessed before the most recently accessed entry.

5. A least-recently-used replacement process comprising:

maintaining a set of used bits that indicate which entries from a set of entries have been recently accessed;

maintaining a record of a plurality of most recent accesses of the entries, wherein the record identifies one or more entries accessed in the plurality of most recent accesses;

in response to the set of used bits indicating that all of the entries have been recently accessed, changing the used bits to indicate that entries other than the one or more entries identified by the record have not been recently accessed and to indicate that the one or more entries identified by the record have been recently accessed; and after changing used bits, selecting for replacement one of the entries which the used bits indicate has not been recently used.

6. The process of claim 5, wherein the set of entries are contained in a cache memory.

7. The process of claim 6, wherein the cache memory is a translation lookaside buffer.

8. The process of claim 5, further comprising:

maintaining a set of validity bits that indicate which if any of the entries from the set of entries contain invalid information; and in response to the validity bits indicating one or more of the entries contain invalid information, selecting for replacement one of the entries which the validity bits indicate contain invalid information, wherein the step of changing used bits is performed only in response to the used bits indicating that all of the entries have been recently accessed and the validity bits indicating that none of the entries contain invalid information.

9. A cache memory comprising:

a plurality of entries, each entry storing a tag value and a status value, the status value indicating whether the entry is available for overwriting;

a comparison circuit coupled to the entries, the comparison circuit generating an address signal that identifies a selected entry which stores a tag that matches an input signal;

a register coupled to comparison circuit, wherein the register stores a record identifying a first entry, the first entry being most recently accessed; and a reset circuit which in response to the status values in the entries indicating that all of the entries are unavailable for overwriting, maintains the status value for the first entry to indicate that the first entry is unavailable for writing and changes status values of other entries to indicate that some of the entries are available for overwriting.

10. The cache memory of claim 9, wherein the cache memory is a translation lookaside buffer.

11. The cache memory of claim 9, further comprising a content addressable memory, wherein the comparison circuit is a portion of the content addressable memory and the tags for each entry are store in the content addressable memory.

12. The cache memory of claim 9, further comprising a random access memory coupled to the comparison circuit, wherein the address signal from the comparison circuit selects information which is stored in the random access memory and is associated with the tag.

13. The cache memory of claim 9, wherein:

the record stored in the register identifies one or more entries accessed in a plurality of most recent accesses of the entries; and in response to the status values in the entries indicating that all of the entries are unavailable for overwriting, the reset circuit maintains status values for the one or more entries to indicate that the one or more entries are unavailable for writing and changes status values of other entries to indicate that some of the entries are available for overwriting.

14. The cache memory of claim 13, wherein the register is a shift register.

* * * * *